US009428068B2

(12) United States Patent
Debert et al.

(10) Patent No.: US 9,428,068 B2
(45) Date of Patent: Aug. 30, 2016

(54) METHOD FOR CONTROLLING RECHARGING OF THE BATTERY ON A HYBRID VEHICLE

(71) Applicant: RENAULT s.a.s., Boulogne-billancourt (FR)

(72) Inventors: Maxime Debert, Versailles (FR); Jean-Marie Vespasien, Choisy-le-Roi (FR)

(73) Assignee: RENAULT s.a.s., Boulogne-billancourt (FR)

( * ) Notice: Subject to any disclaimer, the term of this patent is extended or adjusted under 35 U.S.C. 154(b) by 5 days.

(21) Appl. No.: 14/389,801

(22) PCT Filed: Mar. 19, 2013

(86) PCT No.: PCT/FR2013/050591
§ 371 (c)(1),
(2) Date: Oct. 1, 2014

(87) PCT Pub. No.: WO2013/150206
PCT Pub. Date: Oct. 10, 2013

(65) Prior Publication Data
US 2015/0066273 A1 Mar. 5, 2015

(30) Foreign Application Priority Data
Apr. 3, 2012 (FR) .................................... 12 53048

(51) Int. Cl.
*B60L 11/18* (2006.01)
*B60K 6/442* (2007.10)
(Continued)

(52) U.S. Cl.
CPC ............ *B60L 11/1809* (2013.01); *B60K 6/442* (2013.01); *B60W 10/02* (2013.01); *B60W 10/08* (2013.01);
(Continued)

(58) Field of Classification Search
CPC .... B60W 20/10; B60W 20/13; B60W 20/14; B60W 20/15; B60W 20/20; B60W 20/40; B60L 11/1809
See application file for complete search history.

(56) References Cited

U.S. PATENT DOCUMENTS 6,435,296 B1 8/2002 Arai
2003/0089539 A1 5/2003 Kadota
(Continued)

FOREIGN PATENT DOCUMENTS

DE WO2010011198 A1 * 1/2010 ............ B60W 10/06
EP 1 306 257 5/2003
(Continued)

OTHER PUBLICATIONS

International Search Report Issued Jul. 23, 2013 in PCT/FR13/050591 Filed Mar. 19, 2013.
French Search Report Issued Nov. 19, 2012 in French Patent Application No. 1253048 Filed Apr. 3, 2012.

*Primary Examiner* — Jerrah Edwards
*Assistant Examiner* — Adam Mott
(74) *Attorney, Agent, or Firm* — Oblon, McClelland, Maier & Neustadt, L.L.P.

(57) ABSTRACT

A method for controlling recharging of a traction battery on a motor vehicle hybrid transmission including a heat engine and at least one electrical machine, wherein the electrical machine is used as a sole motor-driven power source up to a speed threshold beyond which it is possible to couple the heat engine with the wheels, in hybrid modes, to run power supplies from the heat engine and the electrical machine simultaneously with each other. In the method, below the speed threshold, the electrical machine ensures only torque to be transmitted to the wheels, while the heat engine is ignited to provide recharging without contributing to pull of the vehicle when a driver bears on the accelerator pedal, and while the wheels are separate from the heat engine and the electrical machine, when the driver does not bear on the accelerator pedal, to enable recharging of the battery.

10 Claims, 9 Drawing Sheets

(51) Int. Cl.
   *B60W 10/02*    (2006.01)
   *B60W 10/08*    (2006.01)
   *B60W 20/00*    (2016.01)
   *H01M 10/44*    (2006.01)
   *H02J 7/00*     (2006.01)
   *B60W 30/18*    (2012.01)

(52) U.S. Cl.
   CPC .............. *B60W 20/00* (2013.01); *B60W 20/20* (2013.01); *H01M 10/446* (2013.01); *H02J 7/007* (2013.01); *B60W 2030/1809* (2013.01); *B60W 2510/244* (2013.01); *B60W 2520/10* (2013.01); *B60W 2540/10* (2013.01); *B60Y 2400/421* (2013.01); *H01M 2220/20* (2013.01); *Y02T 10/6234* (2013.01)

(56) References Cited

U.S. PATENT DOCUMENTS

| | | | | |
|---|---|---|---|---|
| 2003/0144773 | A1* | 7/2003 | Sumitomo | B60K 6/442 |
| | | | | 701/22 |
| 2004/0140711 | A1* | 7/2004 | Romeo | B60T 13/66 |
| | | | | 303/20 |
| 2007/0129862 | A1* | 6/2007 | Kim | B60K 6/445 |
| | | | | 701/36 |
| 2012/0200257 | A1* | 8/2012 | Schwarz | H01M 10/42 |
| | | | | 320/109 |
| 2012/0302397 | A1 | 11/2012 | Habbani | |

FOREIGN PATENT DOCUMENTS

| | | |
|---|---|---|
| FR | 2 950 302 | 3/2011 |
| FR | 2 955 715 | 7/2011 |

* cited by examiner

METHOD FOR CONTROLLING RECHARGING OF THE BATTERY ON A HYBRID VEHICLE

BACKGROUND

The present invention concerns the field of hybrid transmissions for motor vehicles comprising on the one hand a driving heat engine and on the other at least one electrical machine.

More precisely, the invention relates to a method for controlling recharging of the traction battery on a hybrid transmission for a motor vehicle equipped with a heat engine and at least one electrical machine, where the electrical machine is used as the sole motor-driven power source up to a speed threshold beyond which it is possible to couple the heat engine with the wheels, in hybrid modes, so as to run the power supplies from the heat engine and the electrical machine simultaneously with each other.

This invention can be applied in a non-limiting manner to a hybrid transmission for a motor vehicle equipped with a heat engine and a driving electrical machine, comprising two concentric primary shafts each bearing at least one reduction gear on a secondary shaft connected to the wheels of the vehicle and a first coupling means between two primary shafts, said coupling means being able to occupy three positions.

Figure 1:
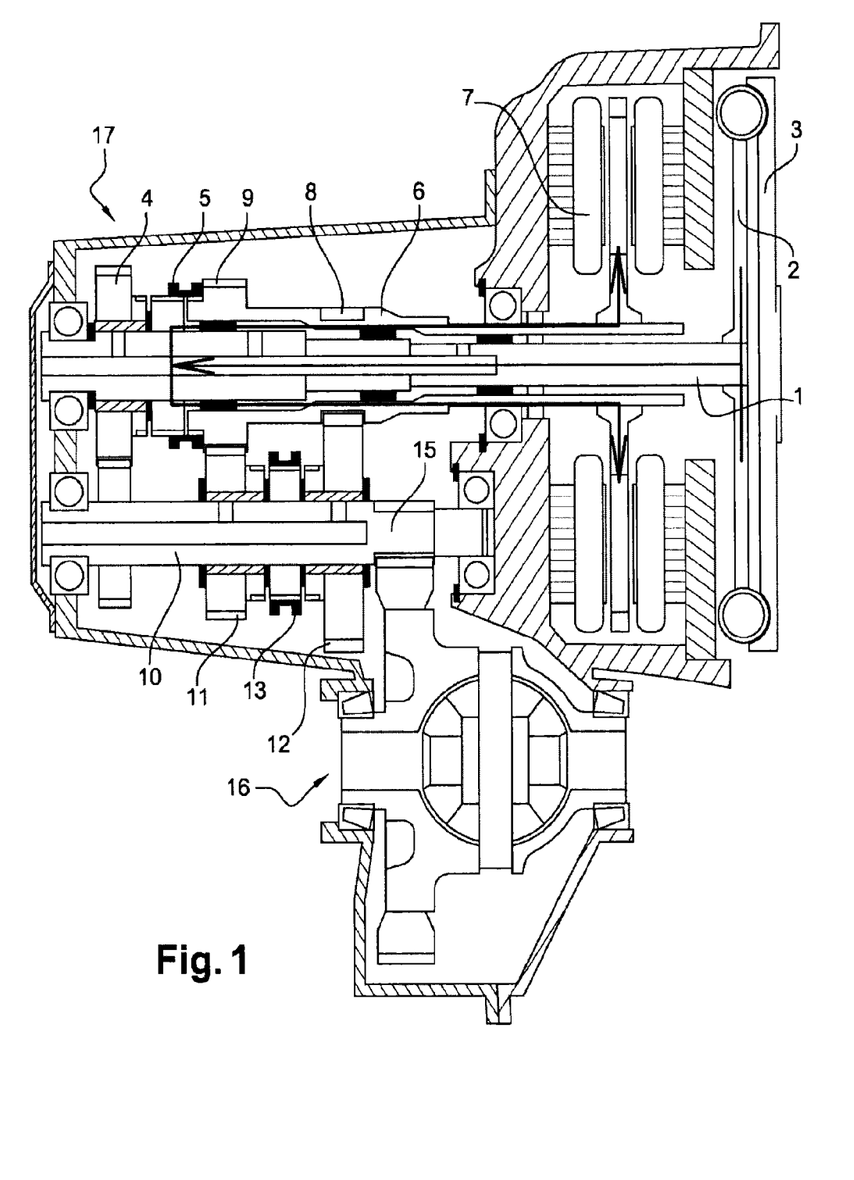
FIG. 1 illustrates the regeneration of the traction battery of a vehicle on a hybrid transmission in neutral.

FIG. 1 describes a non-limiting example of a hybrid transmission having this principle of construction. This transmission comprises a solid primary shaft 1 connected directly by means of a filtration system (shock absorber means, "damper", dual mass flywheel or other) 2 to the flywheel 3 of a heat engine (not shown). The solid shaft 1 carries an idler gear 4 able to be connected thereto by a first coupling system 5 (clutch, synchronizer, or other type of coupler, which may or may not be progressive). A hollow primary shaft 6 is connected to the rotor of an electrical machine 7, preferably (but not obligatorily) of the axial, disk-shaped machine type. Other types of electrical machine can also be used within the scope of the invention, for example radial machines, having an excitation magnet or coil, or reluctance machines. The hollow shaft 6 carries two fixed gears 8, 9. The hollow shaft 6 may be connected to the solid primary shaft 1 by means of the coupling system 5. A secondary shaft 10 carries two idler gears 11 and 12. The idler gears 11, 12 can be connected to the primary shaft by means of a second coupling system 13 (clutch, synchronizer, or other type of coupler, which may or may not be progressive). The secondary shaft 10 also carries a fixed gear 14 and a reduction gear 15 toward a differential 16 connected to the wheels (not shown) of the vehicle.

As indicated above, the first coupling means 5 may occupy at least three positions, in which:

the heat engine is decoupled from the kinematic chain connecting the electrical machine 7 to the wheels (position 1),
the heat engine drives the wheels with or without the contribution of the electrical machine (position 2), and
the heat engine and the electrical machine 7 are coupled so as to add together the respective torques thereof in the direction of the wheels (position 3).

In the hypothesis in which, by construction, a vehicle equipped with such a transmission cannot use the heat engine to contribute to the pull of the vehicle below a speed threshold, the battery is primarily discharging at the low speeds of the vehicle. Beyond the speed threshold, the energy management system of the vehicle is capable of distributing the power between the heat engine and the electrical machine so as to ensure a minimum autonomy of the vehicle in electric mode. When the vehicle travels regularly below the speed threshold, there is the problem of providing an energy reserve in the battery in all circumstances so as to ensure at least the launching of the vehicle until the heat engine is started. Without this reserve of electrical energy, the vehicle is necessarily immobilized in a "roadside recharging mode", in which the heat engine recharges the vehicle battery at standstill before the battery has sufficient energy to re-launch the vehicle.

BRIEF SUMMARY

The object of the present invention is to overcome the disadvantage of immobilizing the vehicle roadside in order to recharge the battery.

With this objective, the invention proposes that, below a speed threshold, the electrical machine ensures only the torque to be transmitted to the wheels, whereas the heat engine is ignited so as to provide recharging without contributing to the pull of the vehicle when the driver presses on the accelerator pedal, while the wheels are decoupled from the heat engine and from the electrical machine when the driver does not press on the accelerator pedal.

In addition, when the driver presses on the brake pedal or completely releases the accelerator pedal, neither the electrical machine nor the heat engine contribute to the pull. They are then used to activate the recharging mode.

BRIEF DESCRIPTION OF THE DRAWING

The present invention will be better understood upon reading the following description of a non-limiting embodiment thereof, with reference to the accompanying drawings, in which.

DETAILED DESCRIPTION

Figure 5:
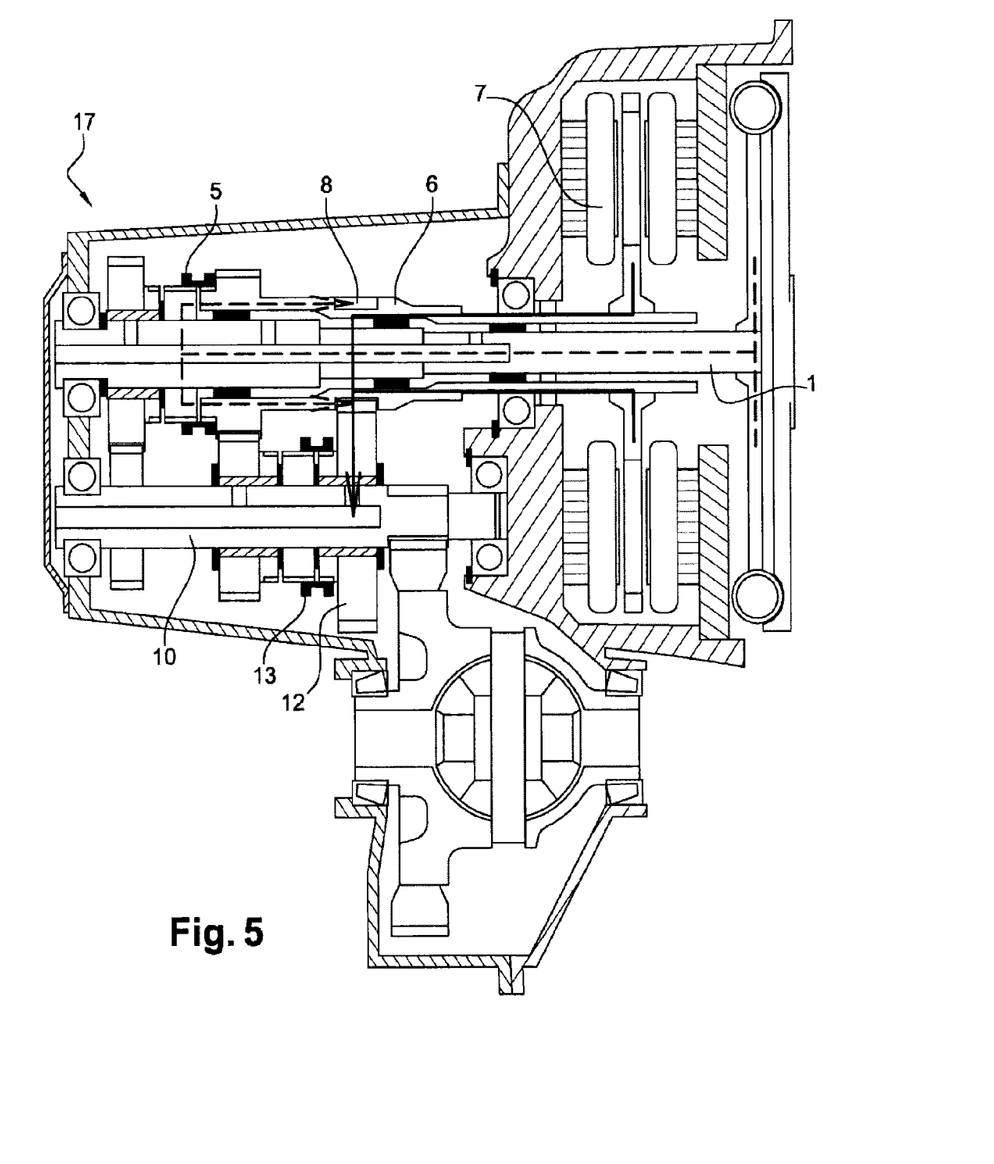
Figure 6:
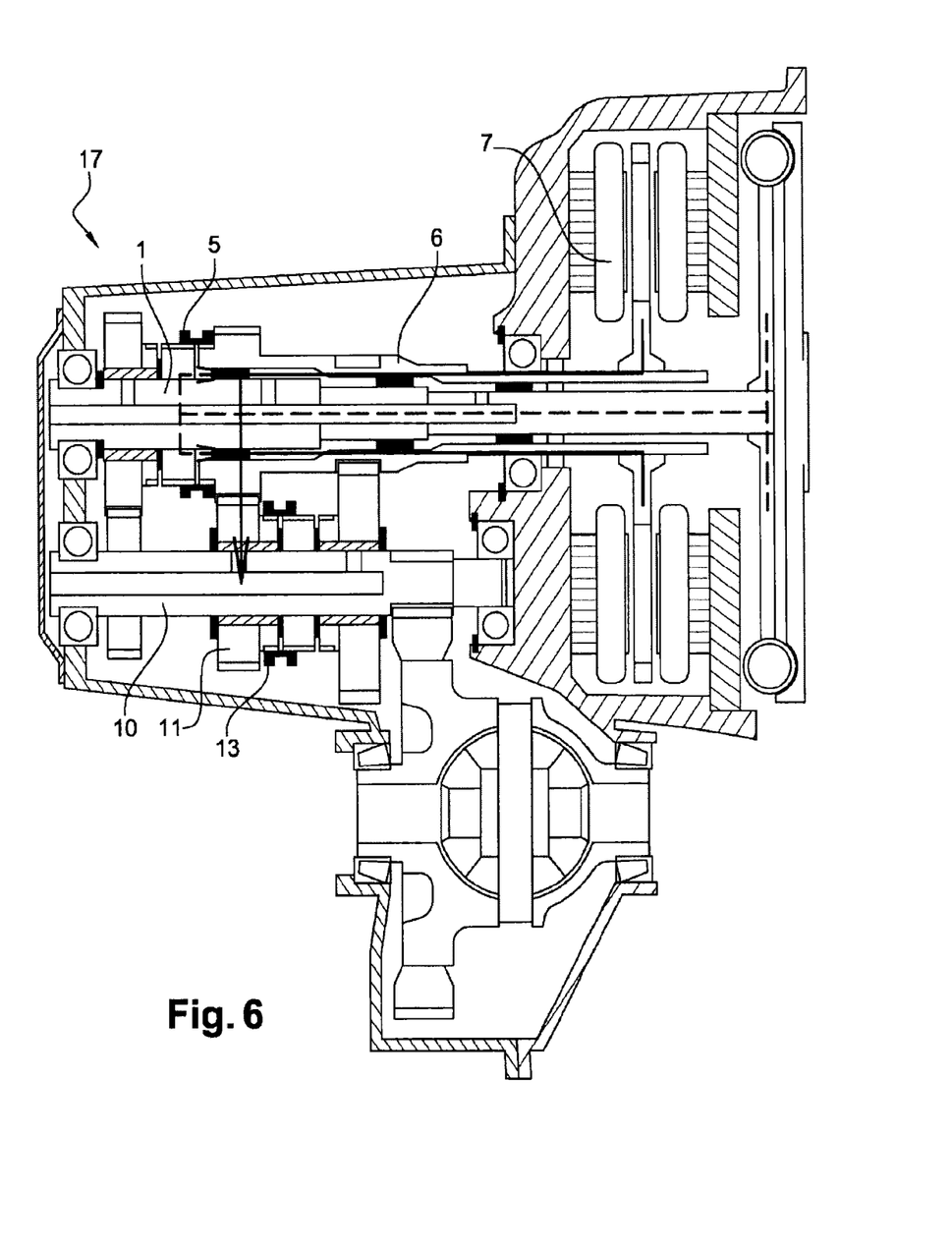

In FIG. 1, the first coupling system is in position 3, as in FIGS. 5 and 6, that is to say it connects in rotation the solid primary shaft 1 and the hollow primary shaft 6. The second coupling system 13 is open. The transmission 17 is thus in "neutral". The turning heat engine can drive the traction electrical machine, thus functioning as a generator to recharge the batteries of the vehicle at standstill.

Figure 2:
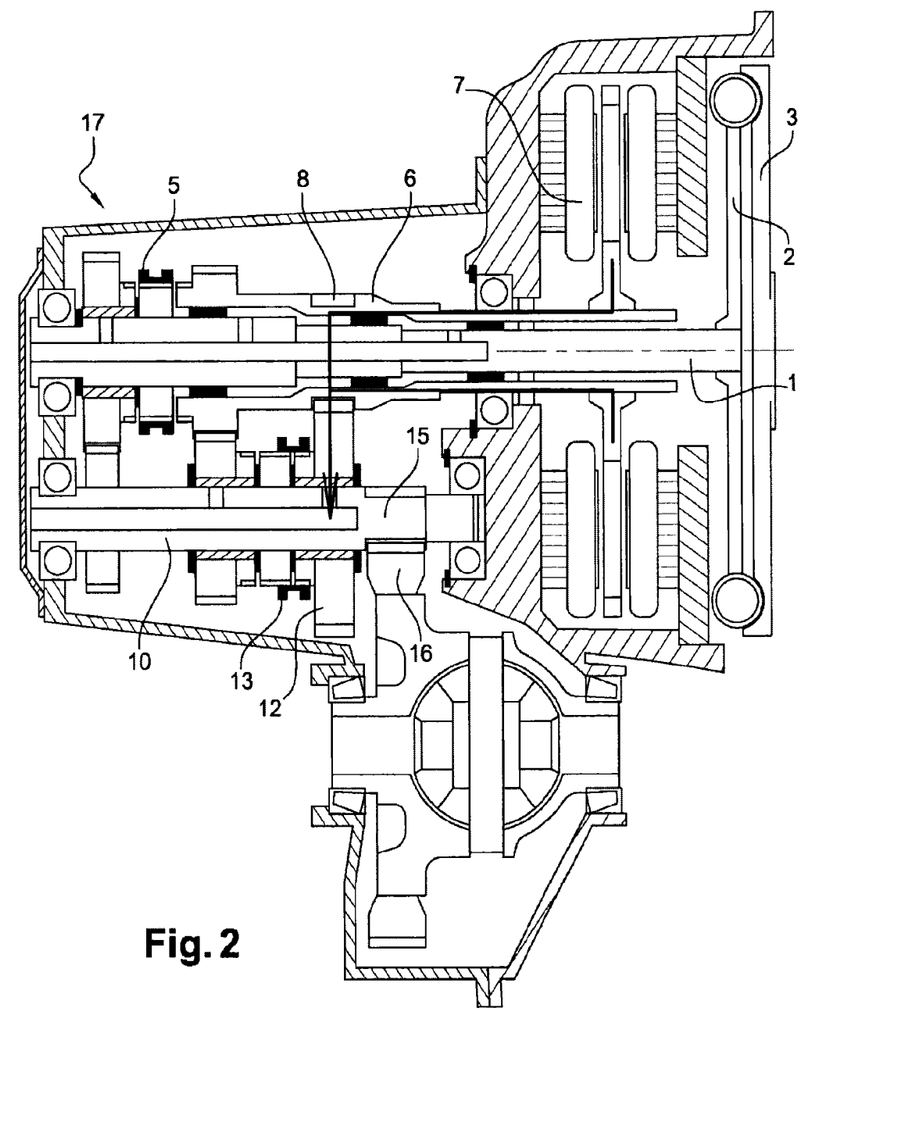
FIGS. 2 to 7 illustrate the different possibilities for operation of this transmission.

In FIG. 2, the first coupling system 5 is open (position 1), whereas the second coupling system 13 is closed so as to interlock the idler gear of the short ratio 12 with the secondary shaft 10. The transmission is in electric mode at the short ratio, or first ratio of forward drive.

Figure 3:
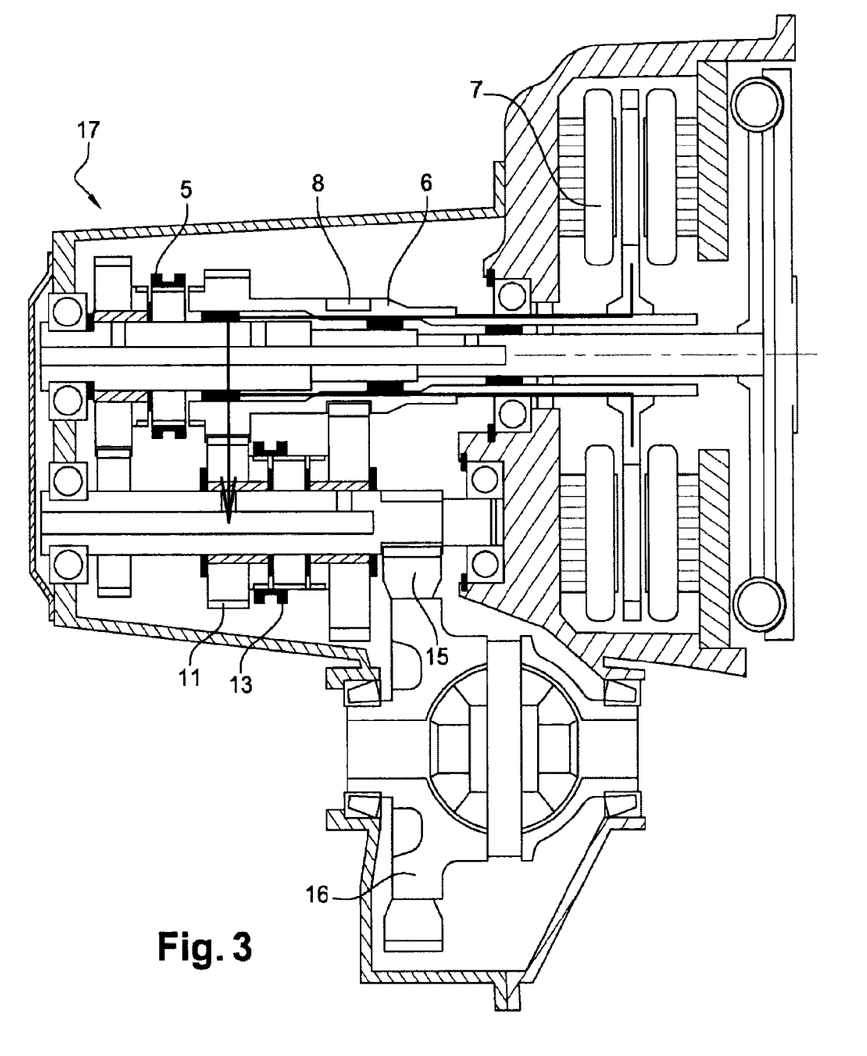

In FIG. 3, the first coupling system 5 is still open (position 1), whereas the second coupling system 13 is closed, so as to interlock the idler gear of the intermediate ratio 11 with the secondary shaft 10. The transmission is in electric mode at the intermediate ratio, or second ratio of forward drive.

Figure 4:
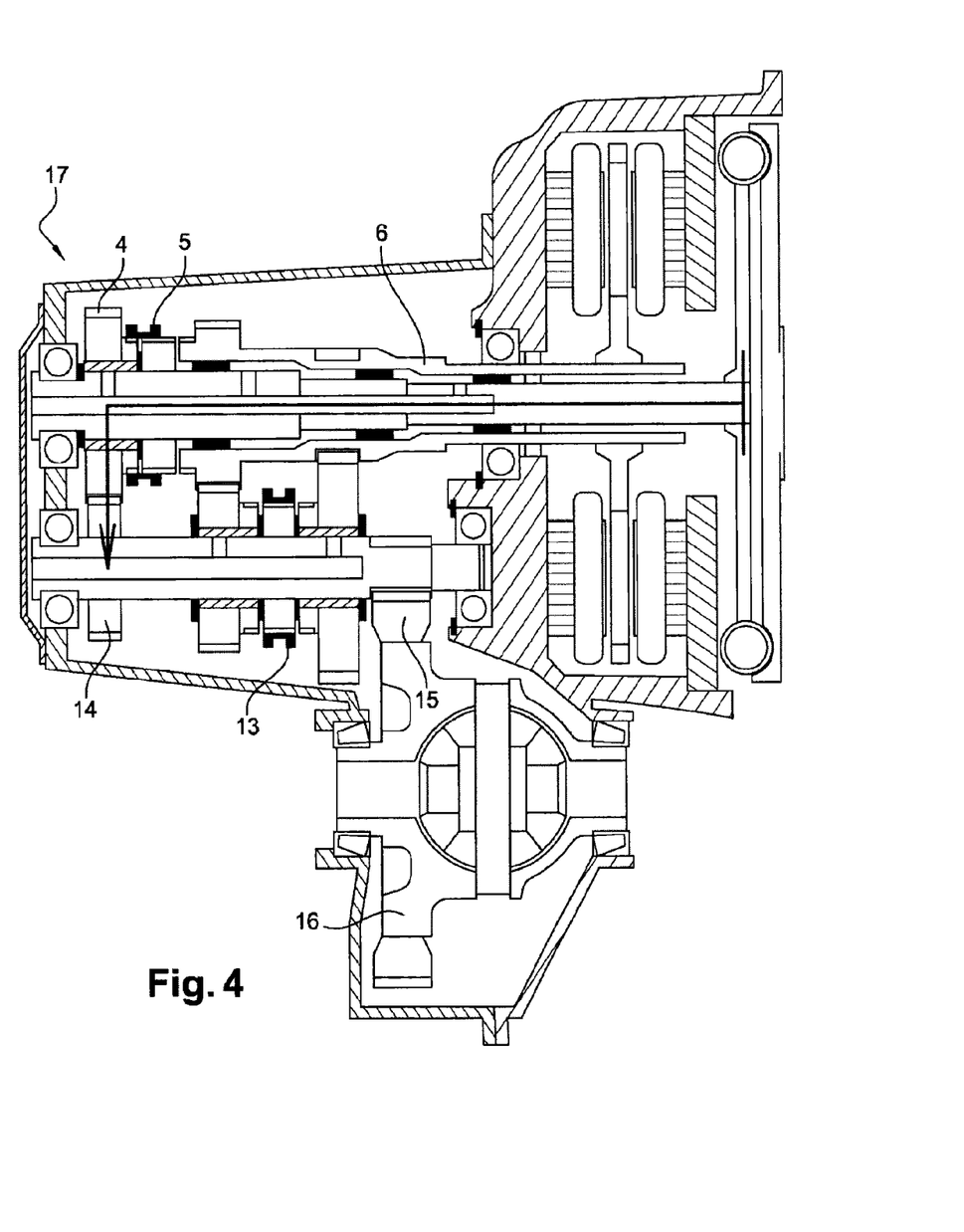

In FIG. 4, the first coupling system 5 is closed in position 2, so as to interlock with the solid shaft 1 the idler gear 4 carried thereby, whereas the second coupling means 13 is open. The transmission is at the long ratio, or third ratio. The electrical machine does not provide torque.

In FIG. 5, the first coupling means 5 is closed in position 3, so as to interlock the solid shaft 1 and the hollow shaft 6. The second coupling system 13 is closed so as to interlock the idler gear of the short ratio 12 and the secondary shaft 10. The transmission is in hybrid mode at the short ratio. The contributions of the heat engine and of the electrical machine to the traction chain are combined. They are transmitted from the hollow primary shaft 6 to the secondary shaft by the reduction gears 8, 12.

In FIG. 6, the first coupling means 5 is still closed, in position 3, as in FIG. 5. The solid primary shaft 1 is thus interlocked with the hollow primary shaft 6. The second coupling system 13 is also closed: the idler gear 11 of the intermediate ratio is interlocked with the secondary shaft 10. The transmission is in hybrid mode at the intermediate ratio. The contributions of the heat engine and of the electrical machine to the traction chain are combined.

Figure 7:
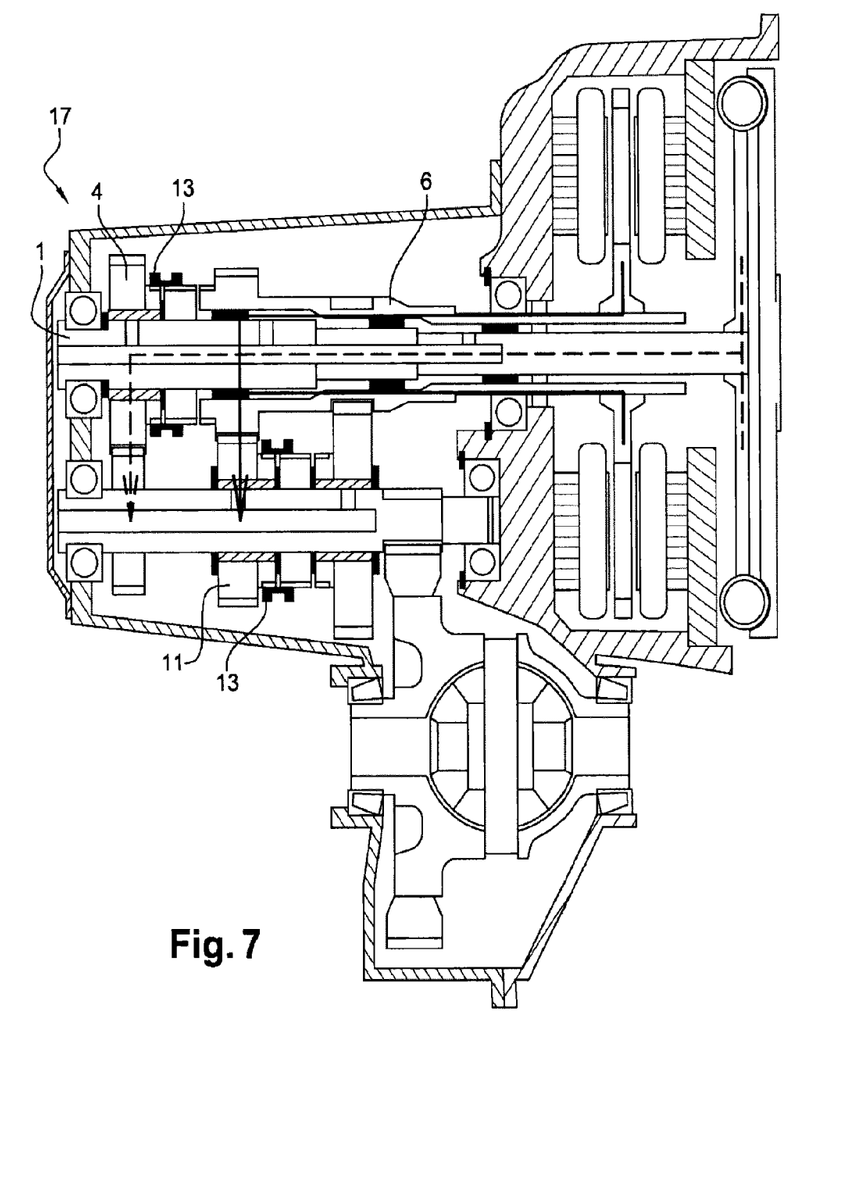

In FIG. 7, the first coupling system 5 is closed in position 2: it interlocks with the solid primary shaft 1 the idler gear 4 carried thereby. In addition, the second coupling means 13 is closed so as to interlock the idler gear 11 of intermediate ratio with the secondary shaft 10. The transmission is in hybrid mode at the long ratio, with combining of the contributions of the heat engine and of the electrical machine.

The proposed strategy for controlling the recharging mode of the battery is preferably implemented below an energy threshold S1 and is deactivated above a threshold S2>S1 of the battery. In addition, it takes into account a speed threshold V of the vehicle, which may correspond to the threshold of engagement of the heat engine for participation in the pull. The control of the recharging of the battery is different in a low speed zone (ZEV), that is to say below the threshold V, and in a high speed zone, that is to say above the threshold V.

At low speed, it is not possible to act on the points of operation, and the electrical machine ensures only the torque to be transmitted to the wheels. The heat engine is ignited to provide recharging, but does not contribute to the pull of the vehicle. When the driver presses on the accelerator pedal (without touching the brake pedal), the kinematic chain of the transmission is that of FIG. 2.

When the driver does not press on the accelerator pedal (foot lifted) or when he presses on the brake pedal, the transmission is in the configuration of FIG. 1 (recharging mode). The wheels are decoupled from the traction elements (engine and machine). The point of operation is defined by acoustic constraints and by the minimization of the consumption. For acoustic reasons, the range of operation of the heat engine is reduced (that is to say it cannot exceed a speed of rotation).

At high speed, the heat engine ensures the torque to the wheel and an addition, which the electrical machine will draw to recharge the battery. The kinematic chain may be the same with and without pressure on the accelerator pedal. The quantity of torque drawn to recharge the battery is selected to minimize the following function:

$$H\_eq=\text{thermal consumption}(\text{engine torque},\text{engine speed})+s\times\text{electricity consumption}(\text{machine torque},\text{machine speed}),$$

in which H_eq is the total quantity of energy consumed and s is the equivalence factor, which gives the correspondence between the electrical energy with the mechanical energy (for example between 1 kWh and the equivalent thereof in grams of fuel). The speeds of the heat engine and of the electrical machine are imposed by the speed of the vehicle and the mode of coupling of the transmission, which means that the strategy adapts depending thereon. The equivalence factor "s" favors the recharging of the battery when the strategy is activated. The functions of thermal consumption and electricity consumption are consumption mappings obtained on test benches. The kinematic chain selected is that of the "town hybrid" mode of FIG. 5, that of the "road hybrid" mode of FIG. 6, or that of the "motorway hybrid" mode of FIG. 7, depending on the speed of the vehicle, that is to say that of one of the usual hybrid modes of the vehicle. The strategy consists of choosing the torque distribution for minimizing the function H_eq:

at high speed, when the recharging strategy is not activated, the equivalence factor is selected to minimize the overall energy consumption; within acceptable limits it is in fact possible to adapt the torque and the heat engine speed to find the best point of operation of the transmission, taking into account the output of the electrical machine and of the heat engine; when the recharging strategy is activated the equivalence factor is selected such that it favors the recharging of the battery, at low speed, when the recharging strategy is not activated, the electrical machine ensures only the pull, the heat engine is switched off and when the driver releases the accelerator or presses on the brake the kinematic mode remains that of FIG. 2 in order to recover the kinetic energy of the deceleration; when the recharging strategy is activated the electrical machine ensures only the pull, the heat engine is ignited and when the driver releases the accelerator or presses on the brake the kinematic mode remains that of FIG. 1 to recharge the battery via the heat engine.

When the driver passes to neutral, at low and high speed, the control is the same as when pressing on the brake at low speed: pass into recharging mode and minimization of the function H_eq depending on the engine speed and torque whilst observing the acoustic constraints, the wheels being decoupled from the heat engine and from the electrical machine.

Figure 8:
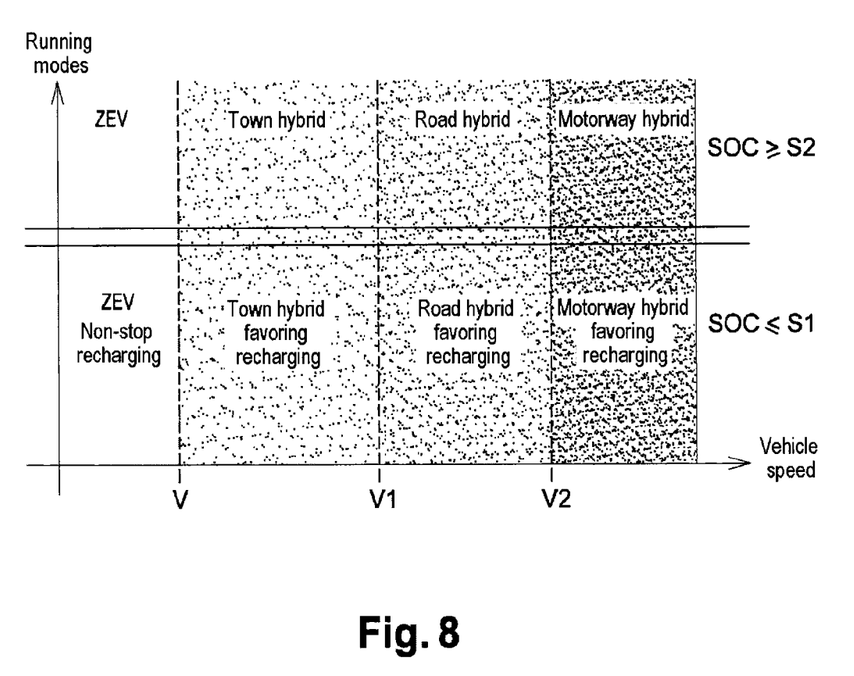
FIGS. 8 and 9 illustrate the implementation of the method on the described transmission.
Figure 9:
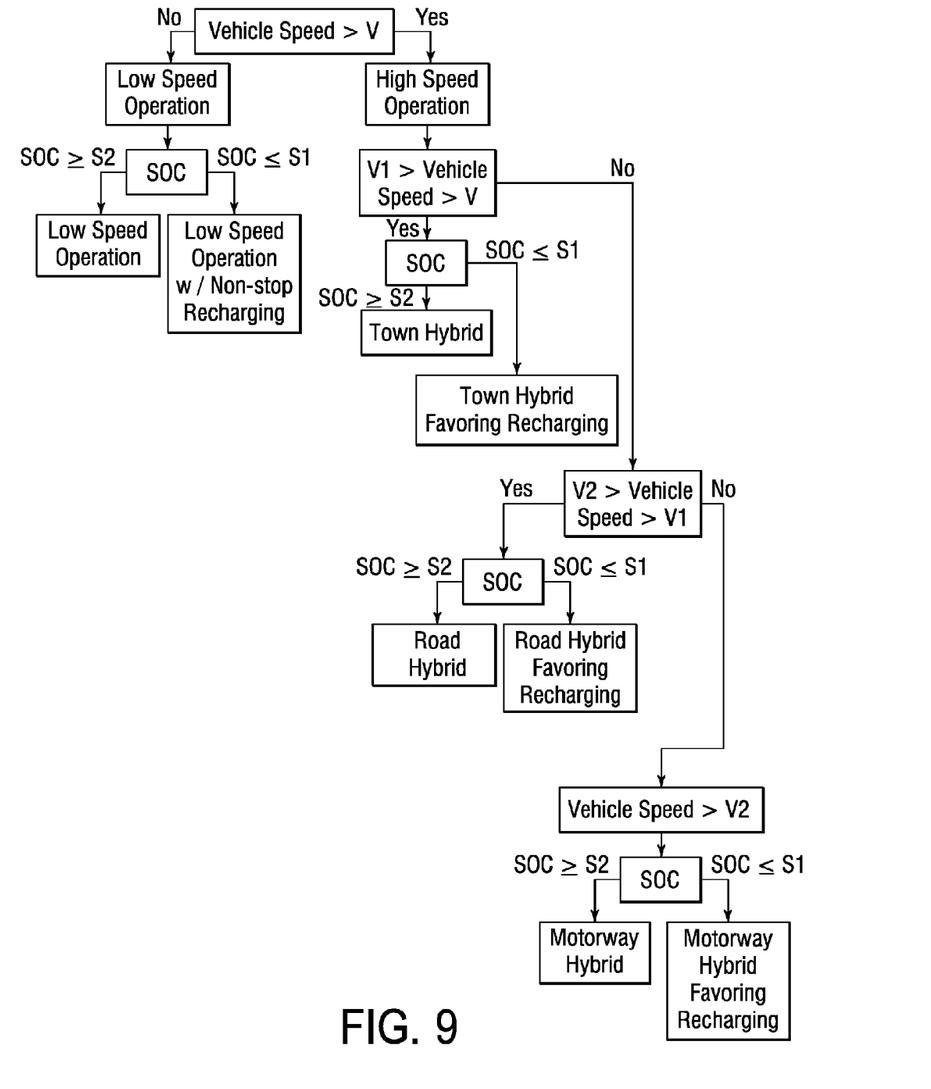

FIGS. 8 and 9 illustrate the implementation of the invention on the transmission described above. The speed threshold V is, for example, 16 kilometers per hour if this speed corresponds to the coupling threshold of the heat engine. This threshold can be that which is retained more generally in a mode of use of the vehicle referred to as prolongation of autonomy or "long range", in which the heat engine is connected after electrical start as soon as the speed allows (at 1500 revolutions per minute, for example at 16 Km/h). The two first ratios then become hybrid, and the electrical machine is essentially used in regeneration. These two hybrid modes "town" (see FIG. 5), when the speed of the vehicle is above speed threshold V and below a first speed V1, and "road" (see FIG. 6), when the speed of the vehicle is above the first speed V1 and below a second speed V2, are supplemented, if desired, by the third hybrid mode "motorway" of FIG. 7, when the speed of the vehicle is above the second speed V2.

FIG. 8 shows two separate values S1 and S2 of the state of charge (SOC) of the battery for the activation threshold when the current state of charge is lower than S1 and for the deactivation threshold S2 when the current state of charge is greater than S2. As indicated above, the transmission, at low speed, has two different configurations below and above the activation threshold. By contrast, it no longer changes state in accordance with the state of charge of the battery beyond the threshold V, in the three hybrid modes thereof, but benefits from a targeted control, favoring recharging below the activation threshold and favoring reduced consumption above said threshold by the choice of a suitable equivalence factor.

In conclusion, the control method proposed by the invention makes it possible to recharge the battery during travel in a coherent operating mode referred to as the "non-stop recharging mode", which makes it possible to prevent the immobilization of a hybrid vehicle in order to recharge the battery when the vehicle does not have the possibility to launch and move at low speeds on the heat engine alone. In this case, it is possible to use the vehicle in a specific mode to recharge the battery during travel. This method is applicable to any transmission of the type described above and to a vehicle equipped with such a transmission, but also to any other transmission and any other hybrid vehicle of which the construction does not make it possible to drive the vehicle by the heat engine over a speed range.

The invention claimed is:

1. A method for controlling recharging of a traction battery on a hybrid transmission for a motor vehicle including a heat engine and at least one electrical machine, wherein the at least one electrical machine includes a first electrical machine used as a sole motor-driven power source up to a speed threshold, the method comprising:
   transmitting, below the speed threshold and when an accelerator pedal of the motor vehicle is pressed, torque to wheels of the motor vehicle via only the first electrical machine and igniting the heat engine without contributing to pull of the motor vehicle; and
   recharging, below the speed threshold and when the accelerator pedal is not pressed, the traction battery via the first electrical machine while the wheels are decoupled from the heat engine and from the first electrical machine,
   wherein the speed threshold is a threshold of engagement of the heat engine such that the heat engine does not contribute to the pull of the motor vehicle as long as a speed of the vehicle is below the speed threshold.

2. The method for controlling recharging of the traction battery as claimed in claim 1, wherein, below the speed threshold, the wheels are decoupled from the heat engine and from the first electrical machine when a brake pedal of the vehicle is pressed.

3. The method for controlling recharging of the traction battery as claimed in claim 1, wherein, when the driver passes to neutral, the heat engine and the first electrical machine are used to recharge the traction battery.

4. The method for controlling recharging of the traction battery as claimed in claim 1, wherein, above the speed threshold, the heat engine ensures the torque to the wheels and an additional energy drawn by the first electrical machine to recharge the traction battery.

5. The method for controlling recharging of the traction battery as claimed in claim 3, wherein, above the speed threshold, the transmission is in a controlled hybrid mode in which a quantity of torque drawn to recharge the traction battery is selected to minimize a total quantity of consumed energy.

6. The method for controlling recharging of the traction battery as claimed in claim 4, wherein, when above the speed threshold and a state of charge of the traction battery is above a deactivation threshold, an equivalence factor between electrical energy and mechanical energy is selected to minimize overall consumption of the electrical energy and the mechanical energy.

7. The method for controlling recharging of the traction battery as claimed in claim 4, wherein, when above the speed threshold and a state of charge of the traction battery is below an activation threshold, an equivalence factor between electrical energy and mechanical energy is selected to favor recharging of the traction battery.

8. The method for controlling recharging of the traction battery as claimed in claim 1, wherein the speed threshold is 16 kilometers per hour.

9. The method for controlling recharging of the traction battery as claimed in claim 1, further comprising:
   switching off the heat engine, when below the speed threshold and a state of charge of the traction battery is above a deactivation threshold, in response to the accelerator pedal being released.

10. The method for controlling recharging of the traction battery as claimed in claim 1, further comprising:
    maintaining operation of the heat engine, when below the speed threshold and a state of charge of the traction battery is below an activation threshold, to provide recharging of the traction battery when the accelerator pedal is released.

* * * * *